US010017900B2

(12) United States Patent
Trani et al.

(10) Patent No.: US 10,017,900 B2
(45) Date of Patent: Jul. 10, 2018

(54) APPARATUS AND METHOD FOR REALIZING A WEB OF FIBROUS MATERIAL

(71) Applicant: Giorgio Trani, Venice (IT)

(72) Inventors: Giorgio Trani, Venice (IT); Marion Sterner, Venice (IT); Federico Cariolaro, Carmignano di Brenta (IT)

(*) Notice: Subject to any disclaimer, the term of this patent is extended or adjusted under 35 U.S.C. 154(b) by 0 days.

(21) Appl. No.: 15/789,993

(22) Filed: Oct. 21, 2017

(65) Prior Publication Data

US 2018/0038049 A1 Feb. 8, 2018

Related U.S. Application Data

(63) Continuation-in-part of application No. 14/904,084, filed as application No. PCT/IB2014/001379 on Jul. 22, 2014.

(30) Foreign Application Priority Data

Jul. 22, 2013 (IT) .................................. VE13A0038

(51) Int. Cl.
*D21H 25/00* (2006.01)
*D21F 11/00* (2006.01)
(Continued)

(52) U.S. Cl.
CPC .............. *D21H 5/24* (2013.01); *D21H 5/025* (2013.01); *D21H 25/005* (2013.01); *B29C 43/46* (2013.01);
(Continued)

(58) Field of Classification Search
CPC ..... B29C 43/003; B29C 43/046; B29C 43/48; B29C 2043/463; B29C 2043/486;
(Continued)

(56) References Cited

U.S. PATENT DOCUMENTS 1,548,788 A * 8/1925 Lorenz .................... B31F 1/122
162/282
2,624,245 A * 1/1953 Cluett ...................... D21H 5/24
156/183

(Continued)

FOREIGN PATENT DOCUMENTS

GB 868391 * 5/1961
WO WO 2005/100686 * 10/2005

*Primary Examiner* — James P MacKey
(74) *Attorney, Agent, or Firm* — Themis Law

(57) ABSTRACT

An apparatus for producing a web of fibrous material includes a roll having incisions with a depth of 0.01-2.00 mm, a width of 0.01-2.00 mm, and a pitch 0.01-10.00 mm, and rotated at a peripheral velocity $v_1$ equal to the velocity of an upstream apparatus unit; a belt stretched between transmission rollers that advances at a velocity $v_2$ less than $v_1$, wherein $v_1/v_2$ lies between 1.05 and 1.40; a presser roller rotating at a peripheral velocity $v_2$, associated with a presser system acting to press the belt against the metal roll with a pressure of 1-200 kg per centimeter; and a system that feeds a sheet of pliable fibrous material between the belt and the roll, the belt having a longitudinal elongation of no more than 5%, dimensional stability along its entire length, a thickness of 1-10 cm, and a hardness 24-70° Shore A.

16 Claims, 2 Drawing Sheets

(51) Int. Cl.
*D21G 1/00* (2006.01)
*D21H 27/00* (2006.01)
*D21H 27/02* (2006.01)
D21H 25/12 (2006.01)
B29C 43/48 (2006.01)
B29C 53/18 (2006.01)
B29C 43/46 (2006.01)

(52) U.S. Cl.
CPC .............. *B29C 43/48* (2013.01); *B29C 53/18* (2013.01); *B29C 2043/463* (2013.01); *B29C 2043/486* (2013.01); *D21F 11/008* (2013.01); *D21G 1/0066* (2013.01); *D21H 5/245* (2013.01); *D21H 25/12* (2013.01)

(58) Field of Classification Search
CPC ..... B29C 53/005; B29C 53/18; B29C 53/265; D21G 1/0066; D21H 5/245; D21H 25/005; D21H 25/12; D21H 25/14; D21F 11/008

See application file for complete search history.

(56) References Cited

U.S. PATENT DOCUMENTS

| | | | |
|---|---|---|---|
| 3,290,209 A | * | 12/1966 | Ihrman .................. D21H 5/245 162/111 |
| 7,918,966 B2 | * | 4/2011 | Trani ...................... D21F 11/02 162/135 |
| 2005/0251977 A1 | * | 11/2005 | Lipponen .............. D21F 3/0209 28/100 |
| 2005/0275132 A1 | * | 12/2005 | Bourdelais .............. B29C 59/04 264/175 |
| 2012/0103552 A1 | * | 5/2012 | Svenka .................... D21G 1/00 162/290 |

* cited by examiner

APPARATUS AND METHOD FOR REALIZING A WEB OF FIBROUS MATERIAL

This Application is a continuation-in-part of application Ser. No. 14/904,084, now abandoned.

FIELD OF THE INVENTION

The present invention relates to an apparatus and a method for producing a web of fibrous material.

BACKGROUND OF THE INVENTION

From U.S. Pat. No. 2,624,245 a method is known for producing continuous webs of paper extensible in a mainly longitudinal direction, i.e. in the direction in which the web extends. This method uses a plant comprising a heated roll having a smooth, preferably chromium-plated surface, and a rubber belt of a certain thickness maintained adhering to the heated roll along a certain portion of its surface by a series of transmission rollers which are at least partly motor-driven. The diameter of the roller which causes the rubber belt to adhere to the commencement of the portion in contact with the heated roll (upstream transmission roller) is small compared with the diameter of said heated roll, such that at their contact generating line the rubber belt undergoes a sudden deviation and then a sudden variation in concavity. The combined effect of this sudden concavity variation, to which the rubber belt is subjected by the upstream transmission roller, which causes said belt to adhere to the heated roll, means that when a paper web under formation, still having a high water content, is introduced between the rubber belt and the heated roll, it is subjected in the portion immediately downstream of the contact generating line to a longitudinal compaction linked to the water quantity contained, to the thickness of the rubber belt, and to the ratio of the diameter of the upstream transmission roller to the diameter of the heated roll.

In its turn, this longitudinal compaction gives the paper web obtained a longitudinal extensibility of about 15% in practice.

However, paper obtained by this method has almost no transverse extensibility, in the sense that the value of this transverse extensibility is of the order of 4-5%, i.e. virtually the same as that found in any traditionally produced paper, for equal mix and refining. It should be also noted that higher values of transverse extensibility can be achieved only by costly refining methods at high density, using complex costly plants with high energy consumption.

From WO2005/100686 a machine is known for producing paper extensible longitudinally and transversely which at the same time is of better smoothness than that obtainable by traditional methods. This known machine comprises a compaction station with a pair of counter-rotating rollers, one of which is of steel, is driven at higher velocity and comprises in its surface a series of circumferentially extending incisions of spiral development, while the other is covered with a rubber layer and is driven at lesser velocity.

When the paper web under formation is made to pass between the two rollers, the combined effect of their different rotation velocity and the presence of the incisions on the steel roller causes longitudinal compaction of the material forming the web and its accumulation within the incisions of the steel roller, and essentially results in the obtaining of a paper web of smooth surface which at the same time possesses good longitudinal and transverse extensibility.

This known solution has proved valid from a theoretical viewpoint but has highlighted limits and drawbacks in its practical implementation, in particular in achieving the high production rate for which current papermaking machines are dimensioned (about 1000 m/min). Taking account of the fact that at the nip between the rubber roller and the steel roller the rubber layer is subjected to local temporary compression, it is clear that a usual rubber roller of diameter 500 mm is subjected to 637 compression cycles per minute, i.e. more than 10 compressions per second. However experimental tests carried out under actual operating conditions have shown that if the number of compressions exceeds 2 per second, the life of the roller suffers, even with the use of complex costly cooling systems.

Hence to reduce to this value the number of compressions of the rubber roller, rollers of a diameter of at least 2500 mm would have to be used, with considerable machine dimension problems and periodic replacement of the rubber layer, an operation which cannot be carried out in the paper works, but only by specialized industries, which are usually not equipped to operate on rollers of such dimensions.

Moreover, rubber-coated rollers of these dimensions present considerable difficulties in their replacement by others with their outer layer of a rubber of different properties such as required for obtaining paper webs of particular characteristics.

From GB 868391 it is also known to produce an extensible paper web by passing the paper web under formation between a rubber roller and a steel roller made to rotate in the opposite directions at the same peripheral velocity. The compression of the paper web on passage between the two rollers results in a temporary local reduction in cross-section, so increasing its passage velocity. When at the exit from the two rollers the paper web under formation regains its original cross-section, the consequent reduction in velocity, accompanied by its adherence to the rubber roller, results in its longitudinal compaction. This is a technical principle totally different from that known from WO2005/100686, which instead uses the different peripheral velocity of two counter-rotating rubber and steel rollers to produce longitudinal compaction of the forming paper web and simultaneous accumulation thereof in incisions provided in the steel roller; and this different principle makes it impossible to combine the teachings deriving from the two aforesaid documents.

SUMMARY OF THE INVENTION

An object of the invention is to obtain a web of fibrous material which overcomes the limits and drawbacks of the state of the art and which presents both a high longitudinal extensibility, in particular up to 20%, and also a high transverse extensibility, in particular exceeding 6%, without the use of high density refining.

Another object of the invention is to obtain a web of fibrous material with an apparatus which does not require costly maintenance, and in particular does not require frequent costly replacement of components made of materials which undergo wear.

Another object of the invention is to obtain a web of fibrous material formed from cellulose fibres, from vegetable fibres in general and/or from synthetic fibres, and in any event with characteristics which can be modified within certain limits, according to requirements.

These and other objects which will be apparent from the ensuing description are attained according to the invention, by an apparatus for producing a fibrous material web of high longitudinal and transverse extensibility, as described hereinafter.

A method for producing a fibrous material web of high longitudinal and transverse extensibility is also described hereinafter.

BRIEF DESCRIPTION OF THE DRAWINGS

The present invention is further clarified hereinafter with reference to the accompanying drawings, in which.

DETAILED DESCRIPTION OF EMBODIMENTS OF THE INVENTION

An apparatus according to the invention for producing a web of fibrous material of high longitudinal and transverse extensibility, for example of paper material, can be inserted into an in-line plant for paper production, in which case it is fed with a sheet of cellulose fibre (virgin, recovered or mixed) to form the web, or can consist of a self-standing apparatus, in which case it is fed with an already formed paper web previously subjected to wetting to a water content between 82% and 30%.

A similar apparatus and plant can also be used to produced vegetable fibre webs, non-woven fabric webs or synthetic fibre webs; in this case it is not possible to talk of water content of the sheet of cellulose fibre mix or of the rewetted paper web, but of the pliability of the fibrous material web, and essentially of its softening temperature.

Independently therefrom, the apparatus comprises a cylindrical roll 2, of metal material, possibly covered with a layer of material presenting different mechanical characteristics (for example ceramic material), and in any event comprising on its cylindrical surface a series of incisions 4 extending along parallel circumferential lines or along spiral lines, and in any event extending with a pattern having a circumferential component.

Figure 1:
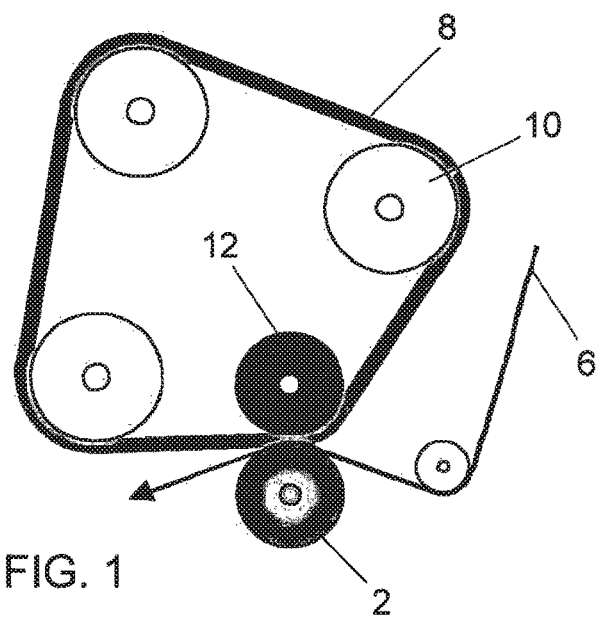
FIG. 1 shows schematically an apparatus for producing a web of fibrous material according to the invention.
Figure 2:
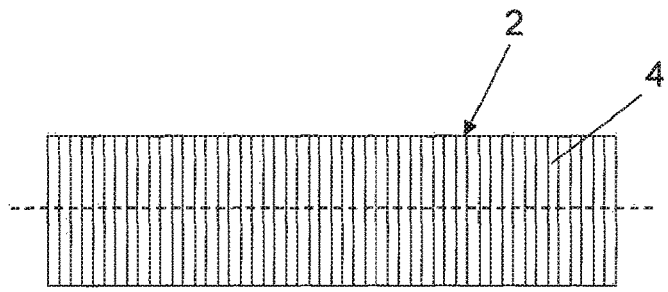
FIG. 2 is a front view of a roll thereof comprising continuous circumferential incisions.
Figure 3:
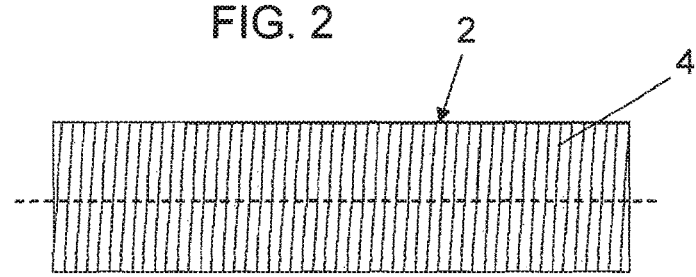
FIG. 3 is a front view of a roll thereof comprising continuous spiral incisions.
Figure 4:
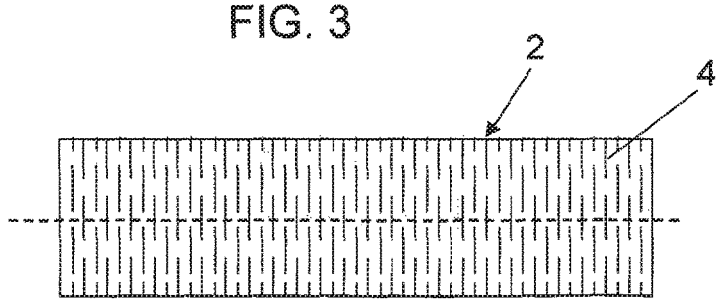
FIG. 4 is a front view of a roll thereof comprising discontinuous circumferential incisions.

FIGS. 2-4 show different arrangements of these incisions, which can be of circumferential pattern (FIG. 2), spiral (FIG. 3) or continuous or discontinuous (FIG. 4).

They can have a depth between 0.01 and 2 mm, preferably between 0.05 and 0.5 mm, width between 0.01 and 2 mm, preferably between 0.07 and 0.9 mm, and pitch between 0.01 and 10 mm, preferably between 0.125 and 1.25 mm. Moreover, in the case of spiral incisions, the angle of inclination can be from the minimum value allowed by the width of the incision to a maximum of 45°, preferably between 5° and 20°, with the spiral pattern being the same along the entire axial length of the roll 2 or be opposing on the two halves of the roll.

As an alternative to the cylindrical shape, the roll 2 can have a convex shape (not shown) which has proved particularly useful for compensating the flexure of its shaft resulting from the forces applied to the ends thereof to exert pressure on the opposing roller, as apparent hereinafter.

The roll 2 is made to rotate at a peripheral velocity $v_1$ substantially equal to the operative velocity of the upstream station, i.e. at the velocity with which a sheet of fibrous material 6 to be processed is fed.

The apparatus according to the invention also comprises a belt 8 of rubber or of different elastic material stretched between motorized rollers 10 and having a thickness between 1 cm and 10 cm, preferably between 2.5 cm and 5 cm, and hardness between 24° Shore A and 70° Shore A, preferably between 29° Shore A and 50° Shore A.

The rollers 10 present a degree of friction against the rubber belt 8 sufficient to ensure its driving at a velocity $v_2$ less than the peripheral velocity $v_1$ of the roll 2. In particular, the ratio $v_1/v_2$ varies between 1.05 and 1.40.

The belt 8 is substantially inextensible longitudinally (during operation it presents a maximum elongation of 5%) at least on that side adhering to the rollers 10, which inextensibility can be achieved, for example, by incorporating longitudinal steel wires into the belt or applying an inextensible fabric to the belt.

Moreover the belt 8 must have a dimensional stability along its entire length, to prevent possible deformations, given that on one side it is in contact with the roll 2, having a peripheral velocity $v_1$, while on the other side it is made to advance at a velocity $v_2<v_1$, and is hence braked longitudinally.

The belt 8 is maintained pressed against the roll 2 by a presser roller 12, made preferably of steel, possibly covered with a surface layer of suitable mechanical characteristics. It can be idle or motorized, but in any event it must have a peripheral velocity of $v_2$. The pressure with which the roller 12 presses the belt 8 against the roll 2 is controlled by suitable mechanical, pneumatic or hydraulic known means. This pressure is between 1 kg and 200 kg per centimeter of width of the belt 8, and is preferably between 20 kg and 40 kg.

The apparatus according to the invention operates in the following manner.

In the initial stage, i.e. before the apparatus is fed with the fibrous material sheet 6, the roll 2 and the rollers 10, 12 rotate at the same peripheral velocity $v_1$ with the roller 12 simply resting on the roll 2.

Under these conditions, the fibrous material sheet 6, having a water content between 82% and 30% in the case of cellulose or vegetable fibre in general, or at a temperature not less than the initial softening temperature in the case of synthetic fibres, and advancing at the velocity $v_1$, is introduced between the rubber roller 8 and the roll 2; the rollers 10 and 12 are progressively raised to the velocity $v_2<v_1$, and the roller 12 is pressed with increasing pressure against the roll 2, to squeeze the belt 8 and the sheet 6 of fibrous material adhering to it.

Figure 5:
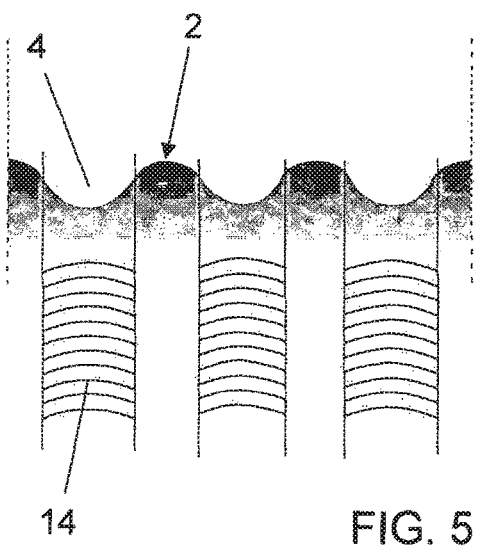
FIG. 5 shows an enlarged partial longitudinal section through a portion of incised roll and, in a position corresponding with the incisions, the pattern of the fibres of a portion of paper web obtained by the apparatus according to the invention.

The combined effect of the longitudinal braking and the squeezing in the thickness direction is to cause the sheet 6 to locally fill the incisions 4 of the roll 2, and become accumulated longitudinally in bands corresponding to the incisions and with curved compaction lines 14, of the type illustrated in FIG. 5.

In its turn, this longitudinal accumulation and the particular arrangement of the fibres, determine the longitudinal and transverse extensibility of the formed fibrous material web, when this reaches the final moisture content of the paper in the case of vegetable fibres, or its dimensional stability in the case of synthetic fibres.

The degree of both longitudinal and transverse extensibility depends on the ratio between the velocities $v_1$ and $v_2$, on the force with which the belt 8 is pressed against the roll 2, on the characteristics of the incisions 4 on the roll 2, on the pliability of the sheet 6 at the commencement and termination of treatment, and on the physical and geometrical characteristics of the rubber belt 8.

Experimental tests carried out to test the effectiveness of the method have enabled paper to be obtained with a degree of longitudinal extensibility of about 20% and transverse extensibility of about 15%.

If the apparatus according to the invention is inserted into a paper web production line, the plant also comprises, in traditional manner, stations for tensioning the rubber belt 8, for its centring, for its cooling, and for its grinding to maintain its thickness uniform.

Before the fibrous material sheet 6 is engaged between the rubber belt 8 and the roll 2, it is impregnated with specific additives able to provide particular characteristics and properties to the final web obtained.

Finally the roll 2 and/or rollers 10 and/or 12 are subjected to cooling or heating during operation, according to specific technological requirements and/or to the properties which the web of fibrous material is required to present.

From the aforegoing it is apparent that the apparatus and method for obtaining webs of fibrous material according to the invention are particularly advantageous, in that they enable webs to be obtained with characteristics of high extensibility both longitudinally and transversal by simple apparatuses of low installation, running and maintenance costs, and with the facility for modifying the extensibility characteristics of the web obtained, on the basis of specific requirements.

In order to obtain fibrous material webs of different characteristics and performance, the fibrous material sheet 6 can be subjected to more than one compaction treatment of the described type, in the sense that the web leaving one apparatus can be inserted, after being possibly subjected to other intermediate treatments, into another apparatus in which the rubber belt 8 and/or the incisions on the surface of the roll 2 and/or the velocities in play and/or the pressures in play can be different.

Figure 6:
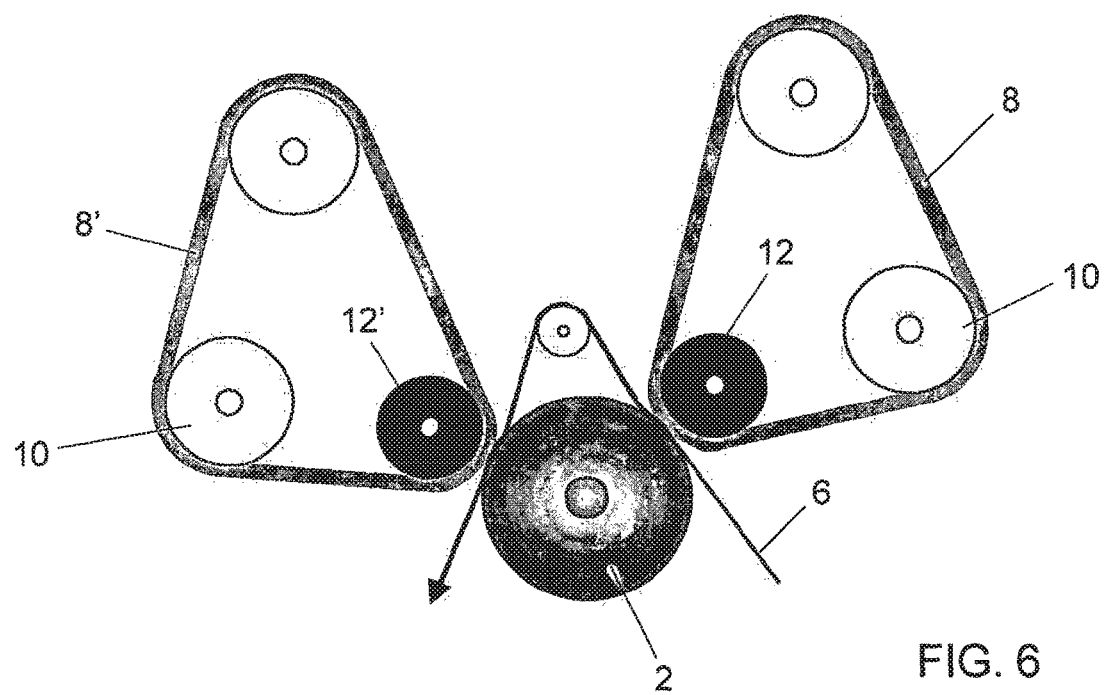
FIG. 6 shows schematically a variant of the apparatus for producing a web of fibrous material.

In the variant illustrated in FIG. 6, an apparatus comprising a single roll 2 having on its surface a plurality of incisions 4 is provided with two rubber belts 8, 8' made to adhere to said roll 2 along different generating lines. In particular, a first rubber belt 8 is made to adhere to the roll 2, having its peripheral velocity $v_1$, by a first presser roller 12 which at the same time is made to advance at a velocity $v_2 < v_1$. A second rubber belt 8' is made to adhere to the same roll 2 by a second presser roller 12' made to advance at a velocity $v_3 < v_2$. Again in this case the velocity ratios $v_1/v_2$ and $v_1/v_3$ independently lie between 1.05 and 1.40.

The fibrous material sheet 6, which enters along a first contact generating line between the first rubber belt 8 and the roll 2 at the velocity $v_1$ leaves these at the velocity $v_2 < v_1$, compacted in both the longitudinal and traverse directions. The said sheet 6, which is withdrawn at its exit along this first contact generating line at the velocity $v_2$, is made to enter along a second contact generating line between the second rubber belt 8', which advances at a velocity $v_3 < v_2$, and the said roll 2, and is subjected to a second compaction treatment.

As there is only one roll 2 there is only a single set of incisions 4 to determine the two compaction treatments on the fibrous material sheet 6.

However, as the two rubber belts 8, 8' can be different, the pressures with which they are pressed against the roll 2 can be different and the velocities in play are different, the second treatment will give the sheet 6 characteristics and performance which are different from those obtained by the first treatment.

From the aforegoing it is apparent that the apparatus and method for producing extensible paper according to the present invention are much more advantageous than those of the state of the art, and in particular of U.S. Pat. No. 2,624,245, WO2005/100686 and GB 868391, in that:

they enable high values of longitudinal and transverse extensibility to be achieved, together with a high degree of paper smoothness, they enable high production rates (of the order of 1000 m/min) to be achieved, hence enabling the apparatus to be inserted into modern papermaking plants, because of the use of a rubber belt instead of a rubber-coated roller, its replacement in the case of wear, besides being much less frequent, is very quick and easy and can be carried out in the actual papermaking works, i.e. where the apparatus is actually used, again because of the use of the belt, which comprises large portions far from the working zone and free on both sides, this can be subjected, if requested, to a series of treatments (cooling, cleaning, grinding, suction, etc.) which in the case of a rubber-coated roller would be difficult if not impossible; in particular the cooling, often required because of the large quantity of heat which can develop during operation, can be carried out very simply, without having to use the complicated systems otherwise required inside rubber-coated rollers, the diameter of the roller which presses the rubber belt against the steel roll is made independent of variations in the apparatus operating velocity, meaning that the nip between the rubber and steel can be of constant width as this velocity varies, in contrast to what occurs in the case of a rubber-coated roller, in which, as stated, the diameter of the rubber-coated roller must be increased as the apparatus velocity varies, the belt can be easily and quickly replaced on site, without having to use specialized outside industries, and lengthy apparatus shut-downs, replacement belts kept in store take up little space and are easily replaced, the width of the nip between rubber and steel can be modified depending on the characteristics of the paper web to be produced.

The invention claimed is:

1. An apparatus for producing a web of fibrous material, comprising:
    a roll of metal material having a lateral surface provided with incisions having a circumferential component, the roll rotating at a peripheral velocity $v_1$ equal to a velocity of an upstream apparatus unit, said incisions having,
    a depth of 0.01-2.00 mm,
    a width of 0.01-2.00 mm, and
    a pitch 0.01-10.00 mm;
    at least one belt of a compressible elastic material stretched between transmission rollers and made to advance at a velocity $v_2$ less than the peripheral velocity $v_1$ of said metal roll, where $v_1/v_2$ lies between 1.05 and 1.40;

at least one presser roller of metal material rotating at a peripheral velocity $v_2$, associated with a presser system acting to press said belt against said metal roll with a pressure between 1 kg and 200 kg per centimeter width of a contact band between said belt and said metal roll; and a system feeding a sheet of pliable fibrous material between said belt and said metal roll, said belt having a degree of elongability in a longitudinal direction not exceeding 5% at least on that side intended to adhere to said presser roller, dimensional stability along its entire length, thickness between 1 cm and 10 cm, and hardness between 24° Shore A and 70° Shore A.

2. The apparatus as claimed in claim 1, further comprising:

two belts of compressible elastic material, made to advance respectively at velocities $v_2$ and $v_3$ where $v_3 < v_2$, both less than the peripheral velocity $v_1$ of said metal roll, where $v_1/v_2$ and $v_1/v_3$ independently lie between 1.05 and 1.40, and two presser rollers rotating with peripheral velocities $v_2$ and $v_3$ and acting to press the respective belt against said metal roll.

3. The apparatus as claimed in claim 1, wherein said metal roll is covered with a layer of ceramic material.

4. The apparatus as claimed in claim 1, wherein said incisions extend circumferentially.

5. The apparatus as claimed in claim 1, wherein said incisions extend in spiral form.

6. The apparatus as claimed in claim 5, wherein said spiral incisions have an inclination not exceeding 45° to circumferential lines.

7. The apparatus as claimed in claim 1, wherein said incisions are continuous.

8. The apparatus as claimed in claim 1, wherein said incisions are discontinuous.

9. The apparatus as claimed in claim 1, wherein said incisions have:

a depth of 0.05-0.50 mm, a width of 0.07-0.9 mm, and a pitch of 0.125-1.25 mm.

10. The apparatus as claimed in claim 1, wherein said presser system acts to press said belt against said metal roll with a pressure between 20 kg and 40 kg.

11. The apparatus as claimed in claim 1, wherein said belt of elastically compressible material has a thickness between 2.5 cm and 5.0 cm.

12. The apparatus as claimed in claim 1, wherein said belt of elastically compressible material has a hardness between 29° Shore A and 50° Shore A.

13. A method for producing a web of fibrous material, comprising:

feeding a sheet of pliable fibrous material between a metal roll rotated at a peripheral velocity $v_1$, and having a lateral surface provided with incisions extending with a circumferential component and having a depth of 0.05-0.50 mm, a width of 0.07-0.9 mm, and a pitch of 0.125-1.25 mm, and at least one belt of elastically compressible material configured to elongate in a longitudinal direction by not more than 5% at least on a side opposite that in contact with said sheet of fibrous material, said belt having dimensional stability along its entire length, said belt further having a thickness between 1 cm and 10 cm, and hardness between 24° Shore A and 70° Shore A;

advancing said belt at a velocity less than a peripheral velocity of said metal roll, a ratio between the velocities of said belt and said metal roll being between 1.05 and 1.40; and maintaining said belt pressed against said roll with a pressure between 1 kg and 200 kg per each centimeter of width of a band of contact between said belt and said roll.

14. The method as claimed in claim 13, wherein maintaining said belt pressed against said roll comprises maintaining said belt pressed against said metal roll with a pressure between 20 kg and 40 kg.

15. The method as claimed in claim 13, wherein said belt has a hardness between 29° and 50° Shore A.

16. The method as claimed in claim 13, wherein said belt has a thickness between 2.5 cm and 5 cm.

* * * * *